United States Patent [19]

Beggs

[11] 4,087,275

[45] May 2, 1978

[54] METHOD FOR DIRECT REDUCTION OF SULFUR-CONTAINING IRON ORE

[75] Inventor: Donald Beggs, Charlotte, N.C.

[73] Assignee: Midrex Corporation, Charlotte, N.C.

[21] Appl. No.: 753,024

[22] Filed: Dec. 22, 1976

Related U.S. Application Data

[62] Division of Ser. No. 630,489, Nov. 10, 1975, Pat. No. 4,032,120.

[51] Int. Cl.² ............................................. C21B 13/02
[52] U.S. Cl. ............................................. 75/35; 75/6
[58] Field of Search ................... 75/34, 26, 35, 91, 6, 75/7, 8, 9

[56] References Cited

U.S. PATENT DOCUMENTS 3,749,386  7/1973  Beggs et al. ............................. 75/35

Primary Examiner—M. J. Andrews
Attorney, Agent, or Firm—Ralph H. Dougherty

[57] ABSTRACT

A method for direct reduction of iron ore containing sulfur in a shaft type reduction furnace wherein two separate streams of spent reducing gas are withdrawn from the reduction furnace. One stream, being substantially free of sulfur, is recycled through a catalytic reformer to produce fresh reducing gas, the other stream, containing sulfur, is utilized in the process where sulfur is not of consequence.

10 Claims, 4 Drawing Figures

METHOD FOR DIRECT REDUCTION OF SULFUR-CONTAINING IRON ORE

This is a division, of application Ser. No. 630,489, filed Nov. 10, 1975 now U.S. Pat. No. 4,032,120.

BACKGROUND OF THE INVENTION

With the rapidly increasing growth of direct reduction of iron throughout the world, there is an increasing shortage of iron oxide feed material in pelletized form, commonly called oxide pellets. Increasingly, there is an economic need to utilize crushed and sized natural lump ore as the oxide feed material for direct reduction. Most of the suitable natural lump ores have a much higher sulfur content than oxide pellets. Generally, oxide pellets have a very low sulfur content inasmuch as most of the sulfur present in the natural ore or concentrate from which the pellets are made is burned out during the firing of the pellets under oxidizing conditions.

When ores containing sulfur are used as the oxide feed material for direct reduction, much of the contained sulfur is liberated from the ore during the reduction process. Such liberated sulfur is present in the spent reducing gas as hydrogen sulfide gas ($H_2S$).

A highly efficient and commercially accepted direct reduction process is described in Beggs and Scarlett U.S. Pat. No. 3,748,120. In this process, spent reducing gas from a shaft type reduction furnace is mixed with hydrocarbon vapor and recycled through a catalytic reformer to produce fresh hot reducing gas. In the field of catalytic reforming of hydrocarbon vapor such as methane or natural gas, it is well known that the presence of $H_2S$ in the reformer has an adverse effect on reforming. The reforming catalyst is deactivated or poisoned by $H_2S$, rendering the catalyst relatively ineffective. When an oxide feed material containing sulfur is used in the direct reduction process of U.S. Pat. No. 3,748,120, the $H_2S$ present in the spent reducing gas is recycled to the catalytic reformer with resultant loss in reforming efficiency.

In the direct reduction of iron oxide to metallic iron, it is well known that the oxide is progressively reduced from hematite ($Fe_2O_3$) to magnetite ($Fe_3O_4$) to wustite (FeO) to metallic iron (Fe). In conventional gaseous reduction wherein reducing gas contains $H_2$ and CO as reductants, and at conventional reduction temperatures in the range of about 1400° F to 1770° F (about 760° to 930° C), the reduction of hematite to magnetite to wustite occurs in about 30 to 45 minutes where oxide pellets or lump ore have a common particle size from about ¼ inch to 1 inch. Metallic iron starts to form in the surface layer of the particle after this 30 to 45 minute period, and the complete reduction of the entire particle to metallic iron requires an additional 3 to 4 hours.

Extensive laboratory tests have been conducted in the direct reduction of sulfur-bearing iron oxide material using reducing gas having $H_2$ and CO as reductants, and under conditions which simulate commercial scale reduction conditions. It has been determined that sulfur is liberated from the feed material during the first 30 to 45 minutes of the reduction cycle, after which time no more sulfur is liberated. The liberated sulfur is in the form of $H_2S$ in the spent reducing gas and is readily measurable. When it was first observed that sulfur liberation ceases after the first 30 to 45 minutes of the reduction cycle, it was reasoned that metallic iron formed on the surface of the particles reacts with $H_2S$ to form an iron-sulfur compound, and the presence of the metallic iron prevents further liberation of sulfur from the particles. To substantiate this theory, a special reduction test was conducted using a weak reducing gas which was thermodynamically incapable of reducing wustite to metallic iron. In other words, in this special reduction test, the final stage of reduction was wustite with no formation of metallic iron. In this special reduction test, it was determined that sulfur was liberated as $H_2S$ continuously for a period of about 8 hours. In view of this observation, it is believed that the initial formation of metallic iron on the surface of the particles during normal direct reduction does, in fact, serve to prevent further sulfur liberation.

OBJECTS OF THE INVENTION

It is the principal object of my invention to provide an improved method for directly reducing particulate metal oxide material to a metallized product in a shaft furnace in which spent top gas is withdrawn in two streams, one stream being free of sulfur, the second stream being sulfur rich.

It is also an object of my invention to provide a highly efficient process for the direct reduction of sulfur-bearing iron oxide or iron ore in which a portion of the spent reducing gas is sulfur free and suitable for catalytic reformer feed gas.

It is another object of my invention to provide a method of avoiding sulfur poisoning of the catalyst in a catalytic reformer when spent reducing gas from a direct reduction furnace is recycled through the catalytic reformer to provide fresh reducing gas.

BRIEF SUMMARY OF THE INVENTION

The aforesaid objects of this invention and other objects which will become apparent as the description proceeds are achieved by providing means for establishing an upper pre-reducing, or sulfur removal, zone in a direct reduction shaft furnace, removing a first portion of reacted or spent reducing gas from the reduction zone of the furnace prior to its reaching the sulfur removal zone, this first portion being substantially sulfur free, and subsequently removing the remaining, sulfur rich portion of spent top gas in a separate removal system for handling this sulfur-containing gas.

Suitable apparatus comprises a multiplicity of reacted gas takeoff pipes extending into the reducing zone of the furnace beneath the sulfur removal zone.

BRIEF DESCRIPTION OF THE DRAWINGS

For a better understanding of this invention, reference should be made to the accompanying drawings wherein.

DETAILED DESCRIPTION

Figure 1:
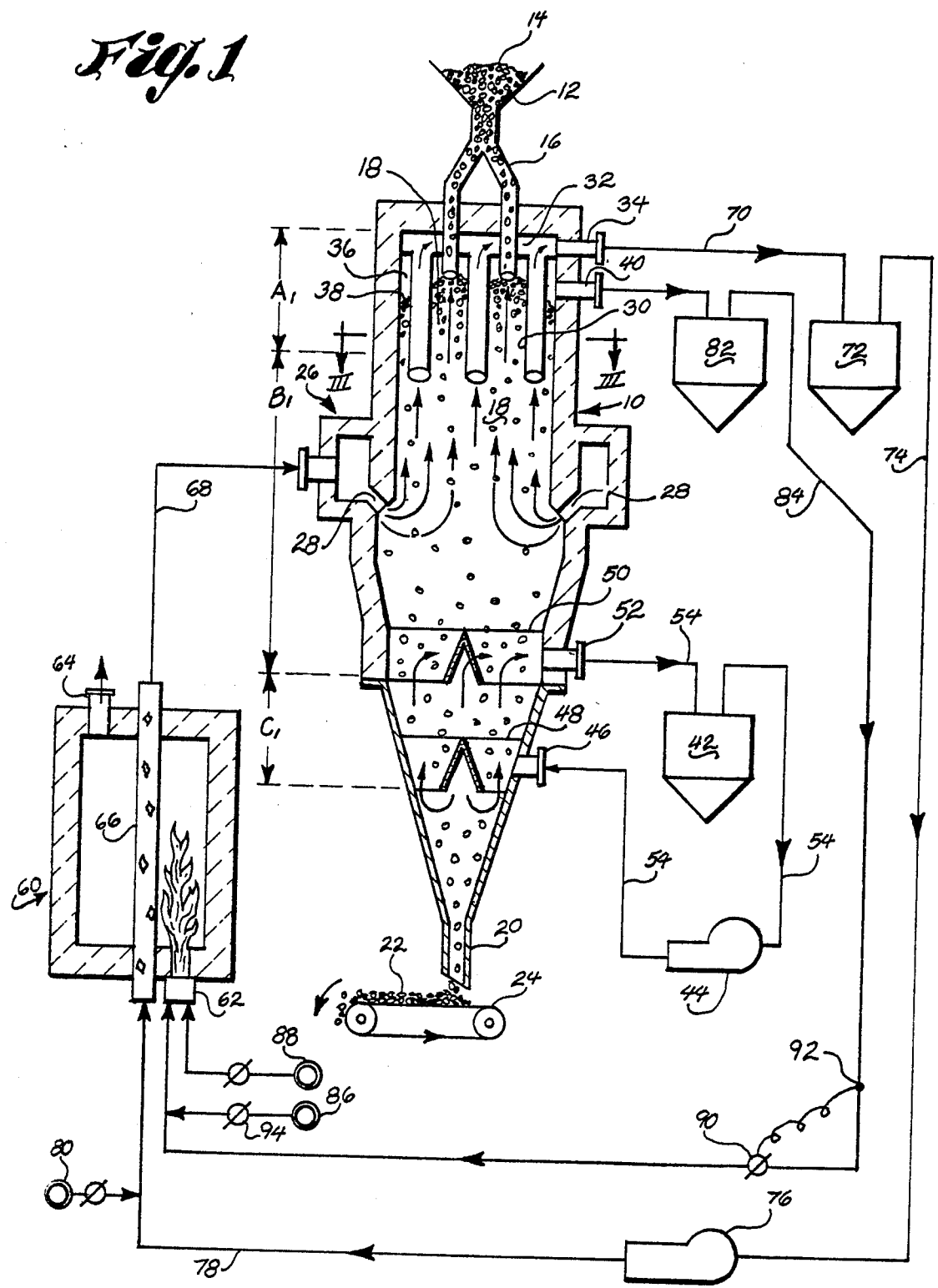
FIG. 1 is a schematic drawing of a vertical shaft furnace with its associated equipment showing one method of practicing the invention.

Referring now to FIG. 1, vertical shaft furnace 10 has a feed hopper 12 mounted at the top thereof into which iron oxide pellets 14 or other particulate feed materials such as lump ore are charged. The pellets descend by gravity through one or more feed pipes 16 to form a bed 18 of particulate iron oxide containing material or burden in the shaft furnace. The upper portion of shaft furnace 10 comprises a pre-reducing sulfur removal zone A1, the central portion of the shaft furnace comprises a reducing zone B1, while the lower portion of the furnace comprises a cooling zone C1. A pellet discharge pipe 20 is located at the bottom of shaft furnace 10. Reduced iron material 22 is removed from the furnace by discharge conveyor 24 located beneath discharge pipe 20. Removal of the metallized pellets via discharge pipe 20 establishes a gravitational flow of the particulate iron oxide burden through shaft furnace 10.

At the central portion of the shaft furnace 10 is a bustle and tuyere system, indicated generally at 26, having gas ports 28 through which hot reducing gas is introduced to flow upwardly in counterflow relationship to the movement of the burden 18. The spent top gas exits the furnace through two separate spent gas offtake systems. Downwardly protruding takeoff pipes 30 communicate with upper plenum 32. The spent top gas from plenum 32 exits the furnace through gas outlet 34. The lower end of each pellet feed pipe 16 extends sufficiently far into the furnace to create a reacted gas disengaging plenum 36, which permits the remaining spent reducing gas to exit generally symmetrically from the pellet stock line 38 and flow freely to reacted gas outlet 40.

A loop recirculating system is provided at the cooling zone of the furnace to cool the pellets prior to their discharge. This system includes a cooler scrubber 42, a recirculating gas blower 44, gas inlet 46, gas distributing member 48 located within furnace 10, gas collecting member 50 positioned above gas distributing member 48 within the furnace, gas outlet 52, and gas circulation pipes 54.

A reformer furnace 60 having a fuel fired burner 62, a flue pipe 64 and a plurality of indirect heat exchanger catalyst tubes 66, which are externally heated by burner 62, only one tube being shown, generates hot reducing gas. The reducing gas flows from the catalyst tubes 66 to the bustle and tuyere system 26 through gas pipe 68.

The substantially sulfur free spent top gas leaving shaft furnace 10 through the gas outlet 34 flows through pipe 70 to a scrubber-cooler 72 wherein the gas is cooled and the dust particles are removed. Pipe 74 leads from scrubber-cooler 72 to a gas blower 76 which is required to circulate the top gas from the scrubber-cooler through pipes 74 and 78. Pipe 78 transmits the spent top gas to the catalyst tubes 66 of the reformer furnace to reform the spent gas into an effective reducing gas by stoichiometric reforming. A source 80 of a gaseous hydrocarbon such as natural gas, is available to enrich the spent top gas in pipe 78 if desired.

Sulfur rich spent top gas leaving the shaft furnace through gas outlet 40 flows to a scrubber-cooler 82 wherein the gas is cooled and the dust particles are removed. Pipe 84 transmits the cleaned and cooled top gas to a burner 62 of the reformer furnace as fuel to be used as a source of heat. A source 86 of a gaseous hydrocarbon such as natural gas delivers make-up gas to burner 62 through pipe 84 when required. Combustion air for the burner 62 in the reforming furnace is supplied from source 88. Valve 90 in pipe 84 opens or closes in response to back pressure controller 92 thus maintaining a constant flow of gas to burner 62 relating to the expansion of gas reformed in the reformer. If the amount of gas resulting from expansion in the reformer tubes is not sufficient to provide the required heat for the reformer, a valve 90 opens to admit natural gas from source 86 to burner 62 as fuel.

Figure 2:
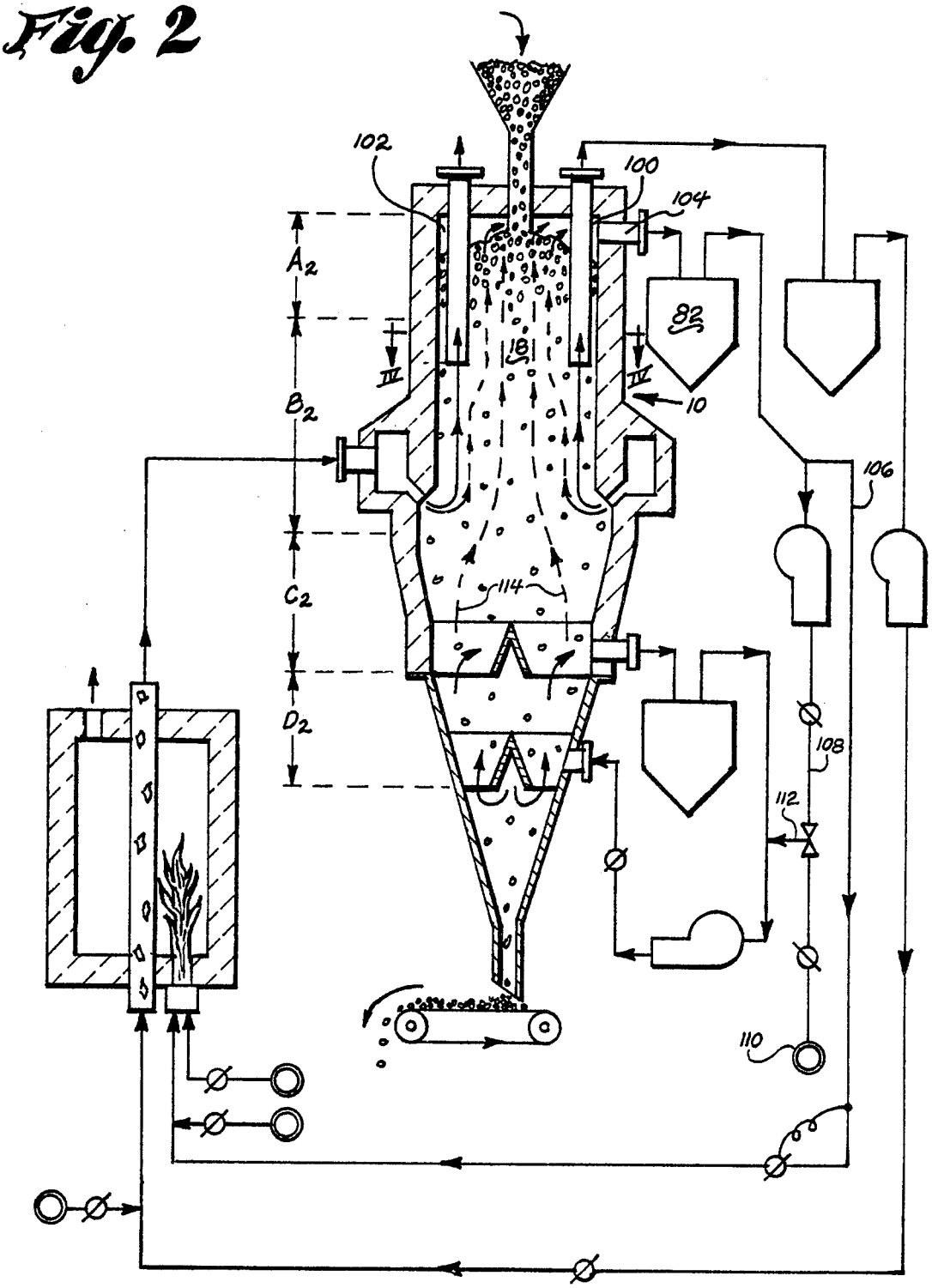
FIG. 2 is a schematic drawing of a vertical shaft furnace showing alternative means for practicing the invention.
Figure 3:
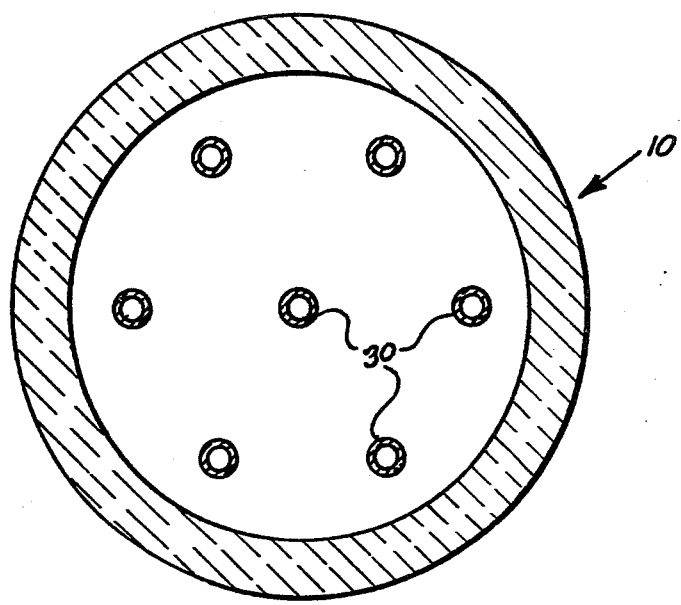
FIG. 3 is a sectional plan view taken along line III—III of FIG. 1.

An alternative embodiment shown in FIG. 2 includes provision for utilizing a portion of the spent top gas as cooling gas, and for allowing a porion of the cooling gas to flow upwardly from the cooling zone into the reducing zone, become heated by the hot burden and act as reductant in the reducing zone. The furnace of FIG. 2 has four distinct zones. Zone A2 in the uppermost portion of the furnace is a sulfur removal and pre-reduction zone. Zone B2 is the reducing zone. Zone C2 is an upflow gas preheat zone, while zone D2 is the cooling zone.

In the alternative embodiment of FIG. 2, a number of downwardly extending spent gas takeoff tubes 100 extend through the top of shaft furnace 10 and into the burden 18. Spent top gas from the single interior plenum 102 in the top of the sulfur removal zone exits the furnace through spent top gas outlet 104 and is cleaned and cooled in scrubber-cooler 82. A portion of the sulfur-containing top gas flows to the burner through pipe 106. A second portion of the sulfur-containing top gas is admitted to the cooling gas recirculating circuit through pipe 108. A hydrocarbon-containing gas such as natural gas or methane can be added to this spent top gas from source 110 to enrich the cooling gas. The recirculating cooling gas circuit is similar to that of FIG. 1 except for the addition of spent gas inlet 112. When gas is added to the cooling gas circuit, a like volume of upflow gas 114 which is forced out of the circuit into the furnace flows upwardly through the upflow gas preheat zone C2 wherein it is heated by the descending hot burden and a portion of the $CO_2$ and $H_2O$ contained therein is reformed to $CO$ and $H_2$ rendering the upflow gas once more an effective reductant.

In the emodiment of FIG. 2, the reductant rich top gas from pipes 100 can be gathered in a plenum not shown before being introduced to cooler-scrubber 82, or each pipe 100 can communicate directly with the cooler-scrubber.

In the operation of the embodiment of FIG. 1, a shaft type reduction furnace has a pre-reduction zone A1, a reduction zone B1 and a cooling zone C1. Fresh hot reducing gas containing $H_2$ and $CO$ as reductants is generated in a catalytic reformer 60 and introduced to the reduction furnace through ports 28 at the lower region of reduction zone B1. The reducing gas flows upwardly through the furnace burden 18. In the upper region of the reduction zone B1, a portion of the gas is removed from the furnace through pipes 30 as a "reduction-rich" partially spent top gas. The remaining portion of the gas flows upwardly through the pre-reduction zone A1 and exits the burden stockline 38 as a relatively "reductant-lean" fully spent top gas.

In the pre-reduction zone A1, which preferably is sized for a burden retention time of 1 to 1½ hours, the incoming particulate oxide feed material is pre-reduced partially to metallic iron. Sulfur, which is liberated from the iron oxide feed material, is confined to the pre-reduction zone, and the $H_2S$, which is liberated, is confined to the reductant-lean top gas.

The reductant-rich top gas which is removed from the burden through the immersed pipes 30 is free of sulfur. The reductant-rich top gas, containing $CO_2$ and $H_2O$ vapor formed in the reduction zone, is cooled, scrubbed of dust and admitted to a catalytic reformer 60. Natural gas or other hydrocarbon vapor is added to the cooled reductant-rich top gas and is reformed by $CO_2$ and residual $H_2O$ vapor present in this cooled top gas to form fresh hot reducing gas.

The reductant-lean, sulfur-containing top gas is cooled and scrubbed of dust, then utilized as fuel to fire the reformer furnace. The reductant-lean top gas will ordinarily contain about 100 to 400 parts per million by volume of $H_2S$ with a typical high sulfur lump ore as the oxide feed material. Although this $H_2S$ level is not acceptable for catalytic reforming, it is a very acceptable level in a fuel gas to be burned.

Figure 4:
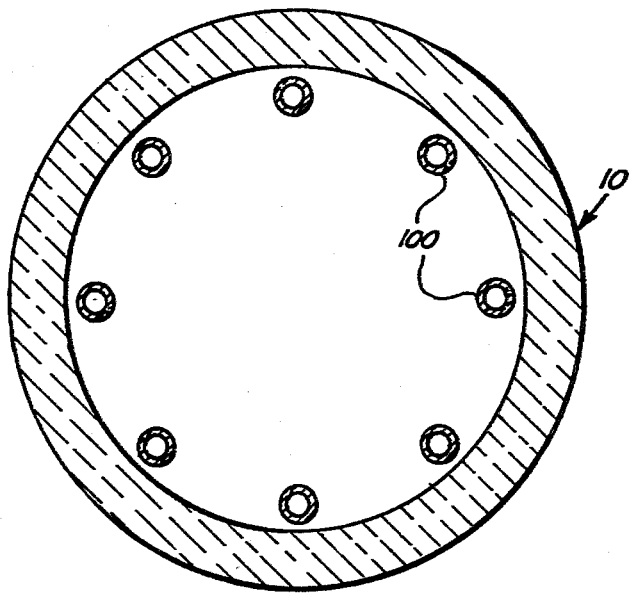
FIG. 4 is a sectional plan view taken along the line IV—IV of FIG. 2.

In the embodiment of FIG. 2, the reductant-rich, sulfur-free top gas is removed from the burden in a region near the wall of the reduction furnace (See FIG. 4), cooled and scrubbed of dust and admitted to a catalytic reformer as heretofore described. The sulfur-laden, reductant-lean top gas is removed at the burden stockline, is cooled and scrubbed of dust. A portion of this gas is used as fuel to fire the reformer furnace. A second portion is admitted to the cooling zone recirculating circuit, and then flows upward from the cooling zone D2 through an upflow gas preheat zone C2 from which the gas converges and flows upward through the center of the reduction zone B2 and pre-reduction zones A2. Natural gas or other hydrocarbon vapor from source 110 is mixed with the reductant-lean top gas which is admitted to the cooling zone circuit, in order to enable some reforming to be achieved in the upflow gas preheat zone C2 to enhance the reducing potential of the upflow gas.

The reductant-rich top gas is removed from the burden 18 through the immersed pipes 100, which are near the wall of the furnace. The location of pipes 100 insures that none of the reductant-lean top gas flowing upwardly from cooling zone D2 and converging to the center of the furnace is commingled with the reductant-rich top gas.

The $H_2S$ in the reductant-lean top gas admitted to the cooling zone D2 is removed from the gas in zone D2 by reaction with the cooled sponge iron. The upflow gas is essentially free of sulfur so that the hot sponge iron burden in the upflow gas preheat zone is an effective reforming catalyst.

It will be understood that the reductant-lean top gas may be used for purposes other than specifically described, such as fuel gas for use external of the direct reduction equipment shown in the drawings.

It can readily be seen from the foregoing that many other alternative embodiments of the invention are possible. Thus, while in accordance with the patent statutes, preferred an alternative embodiments of the invention have been illustrated and described in detail, it is to be particularly understood that the invention is not limited thereto or thereby.

What is claimed is:

1. A method of producing a metallized product comprising:
    (a) establishing a gravitational flow of particulate sulfur-containing metal oxide material by charging the material to the upper portion of a generally vertical furnace having an upper pre-reducing zone, an intermediate reducing zone and a lower cooling zone, and removing the metallized product from the bottom of the furnace;
    (b) introducing a gaseous reductant to the gravitational flow of material at a temperature sufficient to promote a reducing reaction between said reductant and said material at a first inlet intermediate the ends of the furnace;
    (c) causing said reductant to move countercurrent through the gravitational flow of material reducing a substantial portion of the material and forming a spent top gas;
    (d) removing a first portion of said spent top gas from said reducing zone above said first inlet prior to its reaching said pre-reducing zone;
    (e) cooling and scrubbing said first portion of said spent top gas, mixing it with a gaseous hydrocarbon, and passing the mixture through a catalyst-containing, reducing gas reforming furnace and introducing the reformed reducing gas to the reduction zone of the furnace as reductant; and
    (f) removing the remaining portion of said spent top gas having passed through said pre-reducing zone, whereby sulfur is removed from said gravitational flow of material to said spent top gas in said pre-reducing zone, said first portion of said off-gas being substantially sulfur-free, thereby preventing sulfur contamination of the metallized product.

2. A method according to claim 1 further comprising introducing said remaining portion to said catalyst-containing reformer furnace as a fuel to heat the catalyst, thereby maximizing the thermal efficiency of the method.

3. A method according to claim 1 wherein said metal is iron.

4. In a method of producing a metallized iron product in a shaft furnace by countercurrent flow of a reducing gas through a descending burden of particulate sulfur-bearing iron oxide, the improvement comprising establishing a sulfur removal zone for removing sulfur from said particulate iron oxide in the upper portion of said furnace and a reducing zone between said sulfur removal zone, removing a first portion of reacted reducing gas from said reducing zone and a fresh reducing gas inlet prior to said reacted reducing gas reaching the sulfur removal zone, said first portion being substantially sulfur free, and removing the remaining portion of said reacted reducing gas after passing through said sulfur removal zone, said remaining portion being sulfur rich.

5. A method according to claim 4 in which said shaft furnace has an associated catalyst-contaning reformer furnace, said method further comprising generating said reducing in said reformer furnace.

6. A method according to claim 5 further comprising introducing said first portion of said reacted reducing gas to said catalyst to be reformed.

7. A method acording to claim 5 further comprising introducing said remaining portion of said reacted reducing gas to said reformer furnace as fuel to heat the catalyst.

8. A method according to claim 4 further comprising establishing a cooling zone in said shaft furnace beneath said reducing zone, and causing a cooling gas to flow through said cooling zone, cooling the descending burden to a desired discharge temperature.

9. A method according to claim 8 wherein at least a portion of said sulfur-rich reacted reducing gas is introduced to said cooling zone.

10. A method according to claim 9 further comprising causing a portion of the cooling gas, enriched with reacted reducing gas, to flow upwardly into the reducing zone of said furnace and become heated by the descending hot burden, thus reforming the upflowing gas into an effective reductant gas.

* * * * *